United States Patent
Ohsawa et al.

(10) Patent No.: US 9,525,857 B2
(45) Date of Patent: Dec. 20, 2016

(54) COLOR PROCESSING DEVICE, COLOR PROCESSING SYSTEM, AND NON-TRANSITORY COMPUTER READABLE MEDIUM

(71) Applicant: FUJI XEROX CO., LTD., Tokyo (JP)

(72) Inventors: Chizuru Ohsawa, Kanagawa (JP); Toshihiro Iwafuchi, Kanagawa (JP); Noriko Sakai, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/839,284

(22) Filed: Aug. 28, 2015

(65) Prior Publication Data

US 2016/0286188 A1 Sep. 29, 2016

(30) Foreign Application Priority Data

Mar. 24, 2015 (JP) ................................. 2015-061699

(51) Int. Cl.
*H04N 17/00* (2006.01)
*H04N 9/73* (2006.01)

(52) U.S. Cl.
CPC .................................... *H04N 9/735* (2013.01)

(58) Field of Classification Search
CPC ....................................................... H04N 17/00
USPC ............................................ 348/223.1, 224.1
See application file for complete search history.

(56) References Cited

FOREIGN PATENT DOCUMENTS

| JP | 2006-093770 A | | 4/2006 |
|----|----|----|----|
| JP | 2006093770 | * | 4/2006 |
| JP | 2012-044421 A | | 3/2012 |
| JP | 2012-248910 A | | 12/2012 |

* cited by examiner

*Primary Examiner* — Joel Fosselman
(74) *Attorney, Agent, or Firm* — Oliff PLC

(57) ABSTRACT

A color processing device includes the following elements. An image data obtaining unit obtains image data which is obtained by imaging a white member illuminated by a light source and a display device on which a white image is displayed. A color component extracting unit extracts color components of red, green, and blue from image data concerning the white member and image data concerning the white image. A relation determining unit determines a relation between a color temperature and/or a brightness level of the light source and a color temperature and/or a brightness level of the white image, on the basis of a magnitude relation of the extracted color components.

9 Claims, 5 Drawing Sheets

COLOR PROCESSING DEVICE, COLOR PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-061699 filed Mar. 24, 2015.

BACKGROUND

Technical Field

The present invention relates to a color processing device, a color processing system, and a non-transitory computer readable medium.

SUMMARY

According to an aspect of the invention, there is provided a color processing device including the following elements. An image data obtaining unit obtains image data which is obtained by imaging a white member illuminated by a light source and a display device on which a white image is displayed. A color component extracting unit extracts color components of red, green, and blue from image data concerning the white member and image data concerning the white image. A relation determining unit determines a relation between a color temperature and/or a brightness level of the light source and a color temperature and/or a brightness level of the white image, on the basis of a magnitude relation of the extracted color components.

BRIEF DESCRIPTION OF THE DRAWINGS

Exemplary embodiments of the present invention will be described in detail based on the following figures, wherein.

DETAILED DESCRIPTION

Overall Configuration of Color Processing System

Exemplary embodiments of the invention will be described below in detail with reference to the accompanying drawings.

Figure 1:
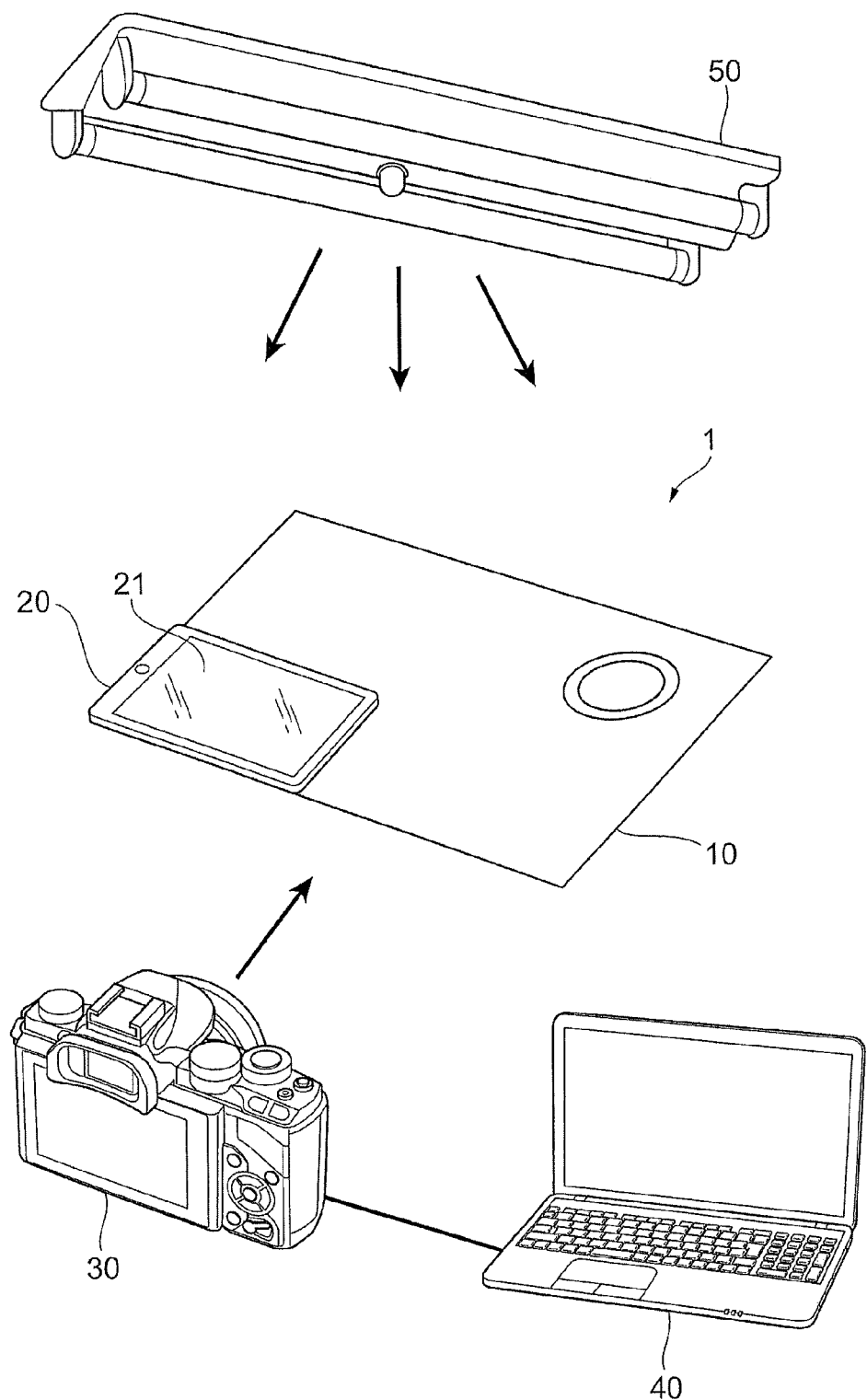
FIG. 1 is a schematic view illustrating an example of the configuration of a color processing system according to an exemplary embodiment.

FIG. 1 is a schematic view illustrating an example of the configuration of a color processing system 1 according to the exemplary embodiments.

As shown in FIG. 1, the color processing system 1 includes a white member 10, a display device 20, an imaging device 30, and a color processing device 40. In FIG. 1, lighting 50 is also shown, though it does not form the color processing system 1.

The white member 10 is, for example, a sheet of white paper. However, the white member 10 does not necessarily have to be paper, and may be, for example, a resin or cloth as long as it is white. The white member 10 is, for example, substantially flat with very little projections and depressions on its surface.

Figure 2:
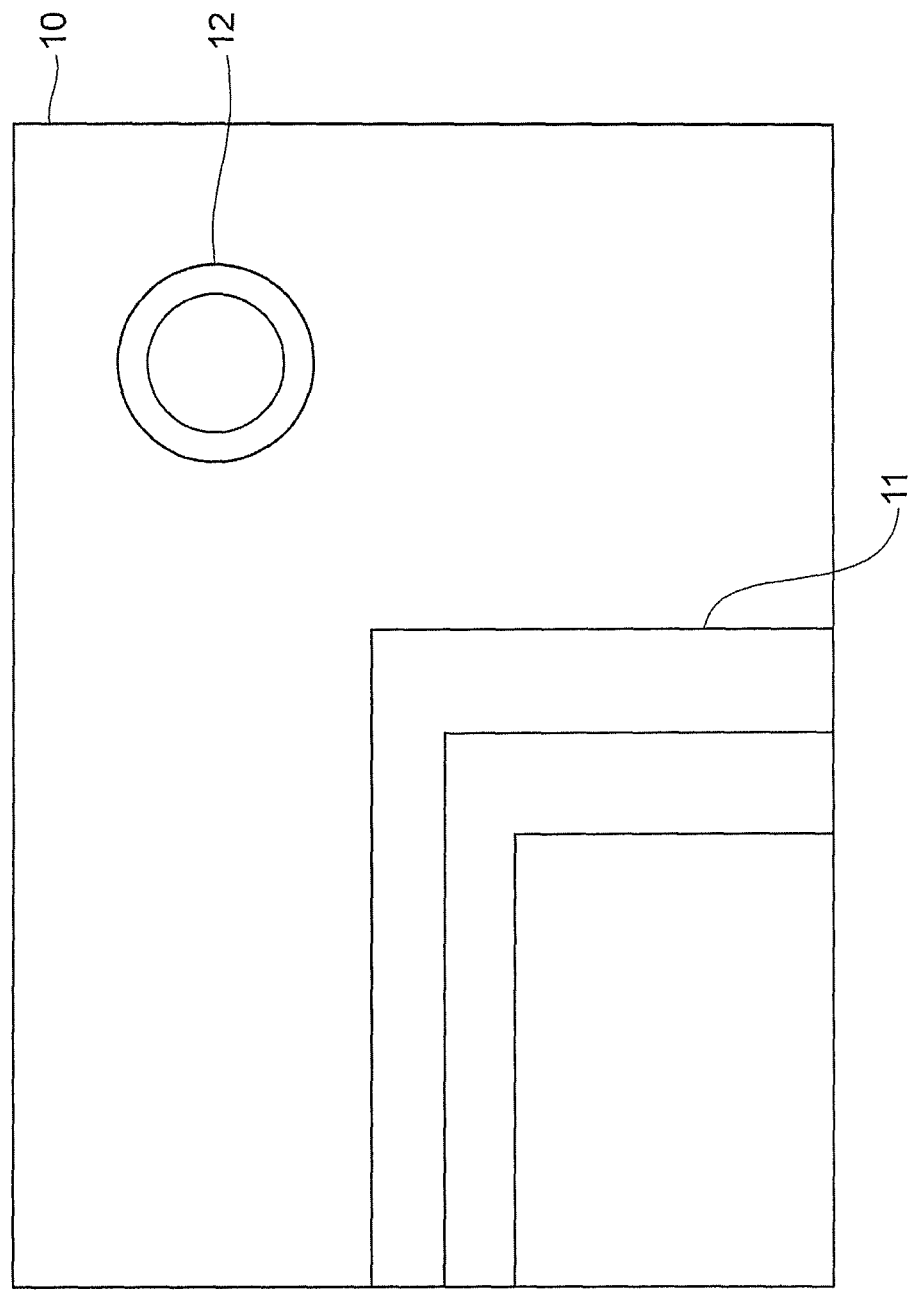
FIG. 2 is a view explaining an example of a white member in detail.

FIG. 2 is a view explaining an example of the white member 10 in detail.

As shown in FIG. 1, the display device 20 is placed on the white member 10. For this purpose, as shown in FIG. 2, alignment lines 11 are drawn on the white member 10 as an example of alignment information for placing the display device 20 on the white member 10. In this case, plural alignment lines 11 (three lines in FIG. 2) are drawn so that they can match various sizes of display devices 20. A user is able to align the display device 20 with the white member 10 by placing the display device 20 along the alignment lines 11. When the display device 20 is placed on the white member 10, the area occupied by the display device 20 may be smaller than the other area of the white member 10 uncovered by the display device 20, that is, the exposed area of the white member 10 may be greater than the display device 20.

The white member 10 is imaged by the imaging device 30, which will be discussed in greater detail later. In this case, it may be difficult to bring the imaging device 30 to focus on the white member 10 because of the above-described characteristics of the white member 10. Accordingly, as an example of focusing information for performing focusing by using the imaging device 30, a symbol (double circle) 12 is indicated on the white member 10. By focusing on the white member 10 at the position at which the symbol 12 is indicated, the imaging device 30 can easily perform focusing. A mark showing a range to be imaged may be indicated on the white member 10, though it is not shown in FIG. 2.

The alignment lines 11 and the symbol 12 are drawn on the white member 10 in advance by, for example, printing.

Referring back to FIG. 1, the function of the display device 20 for displaying an image on a display screen 21 will be discussed. In this case, the display device 20 displays a white image as an image. If the display device 20 displays an image by using input image data of red (R), green (G), and blue (B) (RGB data), a white image is an image displayed when the RGB values of the input image data are maximized. For example, if the input image data is expressed by eight bits (256 tone levels of 0 to 255) of each of R, G, and B, a white image is an image displayed when (R, G, B)=(255, 255, 255) is input into the display device 20 as the input image data.

The display device 20 is, for example, a tablet terminal. However, the display device 20 is not restricted to a tablet terminal, and may be a smartphone or a liquid crystal display. The display device 20 may display images by using a liquid crystal. Alternatively, the display device 20 may display by using another medium, such as plasma or a cathode ray tube.

The imaging device 30 images both of the white member 10 illuminated by the lighting 50 and the display device 20 on which a white image is displayed. In this case, the distance from the imaging device 30 to the white member 10 and that to the white image displayed on the display device 20 is, for example, substantially the same. The angle of the imaging device 30 to the white member 10 and that to the white image is, for example, also substantially the same. With this arrangement, it is likely that the imaging conditions for the white member 10 and those for the white image will be substantially the same.

The imaging device 30 includes an optical system which causes a subject image to converge and an image sensor which detects the converging subject image. The optical system is constituted by a single lens or plural lenses. The image sensor is constituted by an array of imaging elements, such as charge coupled devices (CCDs) or complementary metal oxide semiconductors (CMOSs). The imaging device 30 may be a device which takes still images or a device which takes moving images. That is, the imaging device 30 is, for example, a digital camera. However, the imaging device 30 is not restricted to a digital camera, and may be another device as long as it has an imaging function, it is, for example, a video camera.

In the exemplary embodiments, a user does not have to set the imaging conditions of the imaging device 30. The imaging device 30 performs imaging in an auto mode in which it automatically sets the imaging conditions.

The color processing device 40 determines relations between the color temperature and/or the brightness of the white member 10 and the color temperature and/or the brightness of a white image displayed on the display device 20, on the basis of image data obtained by performing imaging by the imaging device 30. This will be discussed in greater detail later.

The color processing device 40 is, for example, a general-purpose personal computer (PC). Under the control of an operating system (OS), the color processing device 40 operates, various programs, such as application software, so as to determine the relation between the color temperature and/or the brightness of the white member 10 and that of a white image displayed on the display device 20.

The imaging device 30 and the color processing device 40 are connected to each other via a wired network, such as a universal serial bus (USB) and RS-232C. Alternatively, the imaging device 30 and the color processing device 40 may be connected to each other via a wireless communication network. As examples of the wireless communication network, existing networks, such as wireless fidelity (Wi-Fi), Bluetooth (registered trademark), ZigBee, and ultra wideband (UWB), may be used.

With this arrangement, the color processing device 40 is able to receive image data obtained by performing imaging by the imaging device 30. The imaging device 30 and the color processing device 40 do not necessarily have to be connected to each other. Instead, it is sufficient if the imaging device 30 is able to supply image data obtained by performing imaging by the imaging device 30 to the color processing device 40. For example, by using an auxiliary storage device included in the imaging device 30 or the color processing device 40, image data may be sent and received. More specifically, by using a flash memory, such as a secure digital (SD) memory card, image data may be supplied from the imaging device 30 to the flash memory and be stored therein, and then, it may be read from the flash memory into the color processing device 40.

The lighting 50 is an example of a light source, and is an illumination including a light-emitting source, such as a fluorescent lamp, an incandescent lamp, and a light emitting diode (LED). Examples of the lighting 50 are a ceiling illumination fixture, a wall lamp, and a desk lamp.

(Color Processing Device 40)

The color processing device 40 will be described below in greater detail.

Figure 3:
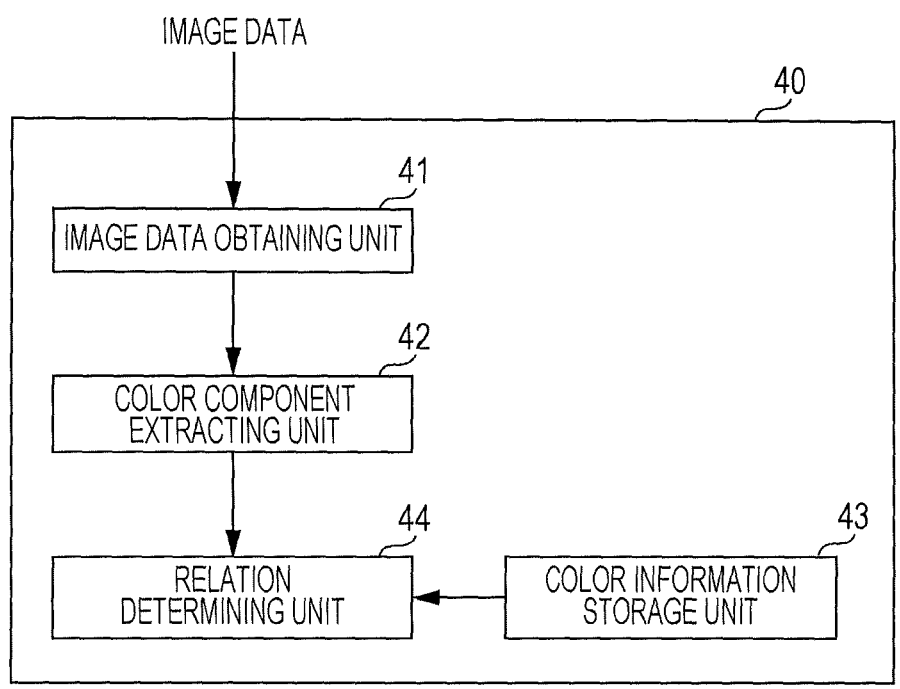
FIG. 3 is a block diagram illustrating an example of the functional configuration of a color processing device.

FIG. 3 is a block diagram illustrating an example of the functional configuration of the color processing device 40.

In FIG. 3, among various functions of the color processing device 40, functions only related to the exemplary embodiments of the invention are shown.

As shown in FIG. 3, the color processing device 40 includes an image data obtaining unit 41 which obtains image data from the imaging device 30, a color component extracting unit 42 which extracts color components from image data, a color information storage unit 43 which stores color information therein, and a relation determining unit 44 which determines the relations between color information concerning the white member 10 and that concerning a white image.

First Exemplary Embodiment

A first exemplary embodiment of the color processing device 40 will be described. In the first exemplary embodiment, the color temperature of one of the lighting 50 and a white image displayed on the display device 20 is known, and on the basis of the known color temperature, the color temperature of the other one of the lighting 50 and the white image is estimated. This estimation method will be discussed in the first exemplary embodiment.

The image data obtaining unit 41 obtains image data which is obtained by imaging the white member 10 and a white image displayed on the display device 20 from the imaging device 30 via the above-described wired network or wireless communication network.

The color component extracting unit 42 extracts color components of R, G, and B from image data concerning the white member 10 and image data concerning the white image. That is, the color component extracting unit 42 extracts RGB data corresponding to an image captured from the white member 10 and RGB data corresponding to an image captured from the white image, on the basis of the image data obtained by the image data extracting unit 41.

The color information storage unit 43 stores therein the color temperature of one of the lighting 50 and the white image as color information.

The relation determining unit 44 determines the relation between the color temperature of the lighting 50 and that of the white image, on the basis of the magnitude relation of the color components extracted by the color component extracting unit 42.

Processing performed by the relation determining unit 44 will be discussed below in detail.

The relation determining unit 44 determines the ratio between B components and R components from the RGB data corresponding to the image captured from the white member 10 and the RGB data corresponding to the image captured from the white image. In this case, the ratio of B components to R components (B/R) is determined.

The relation between B/R of the white member 10 and B/R of the white image is represented by one of the following expressions (1) through (3). The relation between the color temperature of the lighting 50 and that of the white image is represented by one of the following expressions (1)' through (3)' based on expressions (1) through (3), respectively.

$$(B/R \text{ of white member } 10) > (B/R \text{ of white image}) \quad (1)$$

$$\rightarrow (\text{Color temperature of lighting } 50) > (\text{color temperature of white image}) \quad (1)'$$

$$(B/R \text{ of white member } 10) = (B/R \text{ of white image}) \quad (2)$$

$$\rightarrow \text{(Color temperature of lighting } 50\text{)}=\text{(color temperature of white image)} \quad (2)'$$

$$(B/R \text{ of white member } 10) < (B/R \text{ of white image}) \quad (3)$$

$$\rightarrow \text{(Color temperature of lighting } 50\text{)} < \text{(color temperature of white image)} \quad (3)'$$

As the color temperature is higher, the value of B becomes greater in comparison with the value of R. As the color temperature is lower, the value of B becomes smaller in comparison with the value of R. That is, the magnitude relation of B/R can be replaced by the magnitude relation of the color temperature. The color temperature of the white member 10 reflects that of the lighting 50, and thus, the color temperature of the white member 10 and that of the lighting 50 can be considered to be the same. Accordingly, on the basis of the magnitude relation between B/R of the white member 10 and B/R of the white image, the magnitude relation between the color temperature of the lighting 50 and that of the white image is determined. In the first exemplary embodiment, since the color temperature of one of the lighting 50 and the white image is known, the magnitude relation of the color temperature of the other one of the lighting 50 and the white image to the known color temperature is determined on the basis of the known color temperature.

More specifically, the relation determining unit 44 determines the color temperature of the lighting 50 and that of the white image in the following manner.

In the case of the relation between B/R of the white member 10 and B/R of the white image represented by expression (1), if the color temperature of the white image is the following value, the color temperature of the lighting 50 is higher than that of the white image.

Color temperature of white image: 4000 K→color temperature of lighting 50: higher than 4000 K Color temperature of white image: 5000 K→color temperature of lighting 50: higher than 5000 K Color temperature of white image: 6000 K→color temperature of lighting 50: higher than 6000 K In the case of the relation between B/R of the white member 10 and B/R of the white image represented by expression (1), if the color temperature of the lighting 50 is the following value, the color temperature of the white image is lower than that of the lighting 50.

Color temperature of lighting 50: 4000 K→color temperature of white image: lower than 4000 K Color temperature of lighting 50: 5000 K→color temperature of white image: lower than 5000 K Color temperature of lighting 50: 6000 K→color temperature of white image: lower than 6000 K In the case of the relation between B/R of the white member 10 and B/R of the white image represented by expression (2), if the color temperature of the white image is the following value, the color temperature of the lighting 50 is substantially the same as that of the white image.

Color temperature of white image: 4000 K→color temperature of lighting 50: 4000 K Color temperature of white image: 5000 K→color temperature of lighting 50: 5000 K Color temperature of white image: 6000 K→color temperature of lighting 50: 6000 K In the case of the relation between B/R of the white member 10 and B/R of the white image represented by expression (2), if the color temperature of the lighting 50 is the following value, the color temperature of the white image is substantially the same as that of the lighting 50.

Color temperature of lighting 50: 4000 K→color temperature of white image: 4000 K Color temperature of lighting 50: 5000 K→color temperature of white image: 5000 K Color temperature of lighting 50: 6000 K→color temperature of white image: 6000 K In the case of the relation between B/R of the white member 10 and B/R of the white image represented by expression (3), if the color temperature of the white image is as the following value, the color temperature of the lighting 50 is lower than that of the white image.

Color temperature of white image: 4000 K→color temperature of lighting 50: lower than 4000 K Color temperature of white image: 5000 K→color temperature of lighting 50: lower than 5000 K Color temperature of white image: 6000 K→color temperature of lighting 50: lower than 6000 K In the case of the relation between B/R of the white member 10 and B/R of the white image represented by expression (3), if the color temperature of the lighting 50 is the following value, the color temperature of the white image is higher than that of the lighting 50.

Color temperature of lighting 50: 4000 K→color temperature of white image: higher than 4000 K Color temperature of lighting 50: 5000 K→color temperature of white image: higher than 5000 K Color temperature of lighting 50: 6000 K→color temperature of white image: higher than 6000 K In this example, the relation determining unit 44 merely determines the magnitude relation between the color temperature of the lighting 50 and that of the white image. Alternatively, another method may be employed. The color temperature of one of the lighting 50 and a white image is changed, and then, the imaging device 30 images the white member 10 and the white image. The image data obtaining unit 41 then obtains image data which is obtained by imaging the white member 10 and the white image, and the relation determining unit 44 determines plural magnitude relations between the color temperature of the lighting 50 and that of the white image. The relation determining unit 44 then determines the upper limit and the lower limit of the color temperature of the other one of the lighting 50 and the white image. In this manner, the range of the color temperature is determined.

Figure 4:
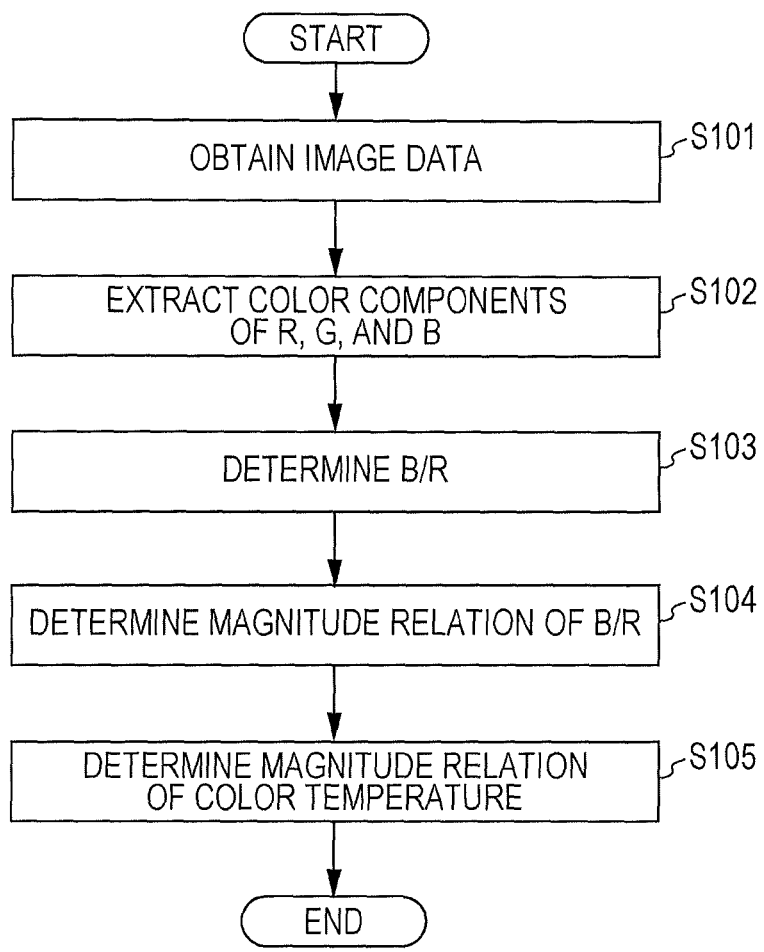
FIG. 4 is a flowchart illustrating an operation performed by a color processing device of a first exemplary embodiment.

FIG. 4 is a flowchart illustrating an operation performed by the color processing device 40 according to the first exemplary embodiment.

In step S101, the image data obtaining unit 41 obtains image data from the imaging device 30. This image data is data obtained by imaging both of the white member 10 and the display device 20 on which a white image is displayed.

Then, in step S102, the color component extracting unit 42 extracts color components of R, G, and B from image data concerning the white member 10 and image data concerning the white image.

Then, in step S103, the relation determining unit 44 determines B/R as the ratio between B components and R components.

In step S104, the relation determining unit 44 determines the magnitude relation between B/R of the white member 10 and that of the white image.

Then, in step S105, the relation determining unit 44 determines the magnitude relation between the color temperature of the lighting 50 and that of the white image. In this manner, on the basis of the color temperature of one of the lighting 50 and the white image, the color temperature of the other one of the lighting 50 and the white image is estimated.

Second Exemplary Embodiment

A second exemplary embodiment of the color processing device 40 will be described below. In the second exemplary embodiment, the brightness of one of the lighting 50 and a white image displayed on the display device 20 is known, and on the basis of the known brightness, the brightness of the other one of the lighting 50 and the white image is estimated. This estimation method will be discussed in the second exemplary embodiment.

Processing performed by the image data obtaining unit 41 and the color component extracting unit 42 is similar to that of those of the first exemplary embodiment. Accordingly, a description will be given of processing performed by the color information storage unit 43 and the relation determining unit 44.

The color information storage unit 43 stores therein the brightness of one of the lighting 50 and a white image as color information.

The relation determining unit 44 determines the relation between the brightness of the lighting 50 and that of the white image on the basis of the magnitude relation of color components extracted by the color component extracting unit 42.

The relation determining unit 44 compares color components of G of the white member 10 with those of the white image, on the basis of RGB data corresponding to an image captured from the white member 10 and RGB data corresponding to an image captured from the white image.

The relation between G of the white member 10 and G of the white image is represented by one of the following expressions (4) through (6). The relation between the brightness of the lighting 50 and that of the white image is represented by one of the following expressions (4)' through (6)' based on expressions (4) through (6), respectively.

$$(G \text{ of white member } 10) > (G \text{ of white image}) \quad (4)$$

$$\rightarrow (\text{Brightness of lighting } 50) > (\text{brightness of white image}) \quad (4)'$$

$$(G \text{ of white member } 10) = (G \text{ of white image}) \quad (5)$$

$$\rightarrow (\text{Brightness of lighting } 50) = (\text{brightness of white image}) \quad (5)'$$

$$(G \text{ of white member } 10) < (G \text{ of white image}) \quad (6)$$

$$\rightarrow (\text{Brightness of lighting } 50) < (\text{brightness of white image}) \quad (6)'$$

As the brightness is higher, the value of G becomes greater. As the brightness is lower, the value of G becomes smaller. That is, as a result of comparing the values of G, the magnitude relation of the brightness is determined. The brightness of the white member 10 reflects that of the lighting 50. Accordingly, on the basis of the magnitude relation between G of the white member 10 and G of the white image, the magnitude relation between the brightness of the lighting 50 and that of the white image is determined. In the second exemplary embodiment, since the brightness of one of the lighting 50 and the white image is known, the magnitude relation of the brightness of the other one of the lighting 50 and the white image to the known brightness is determined on the basis of the known brightness. Alternatively, since the ratio between the value of G of the white member 10 and that of the white image can be considered to be the ratio between the brightness of the lighting 50 and that of the white image, the absolute value of the brightness of the other one of the lighting 50 and the white image may be estimated.

More specifically, the relation determining unit 44 determines the brightness of the lighting 50 and that of the white image in the following manner.

In the case of the relation between G of the white member 10 and that of the white image represented by expression (4), if the brightness of the white image is the following value and if the value of G of the white member 10 is twice as high as that of the white image, the brightness of the lighting 50 is about twice as high as that of the white image.

Brightness of white image: 250 $Cd/cm^2$→Brightness of lighting 50: about 500 $Cd/cm^2$ Brightness of white image: 125 $Cd/cm^2$→Brightness of lighting 50: about 250 $Cd/cm^2$ In the case of the relation between G of the white member 10 and that of the white image represented by expression (4), if the brightness of the lighting 50 is the following value and if the value of G of the white image is half of that of the white member 10, the brightness of the white image is about half of that of the lighting 50.

Brightness of lighting 50: 250 $Cd/cm^2$→Brightness of white image: about 125 $Cd/cm^2$ Brightness of lighting 50: 125 $Cd/cm^2$→Brightness of white image: about 62.5 $Cd/cm^2$ In the case of the relation between G of the white member 10 and that of the white image represented by expression (5), if the brightness of the white image is the following value and if the value of G of the white member 10 is the same as that of the white image, the brightness of the lighting 50 is about the same as that of the white image.

Brightness of white image: 250 $Cd/cm^2$→Brightness of lighting 50: about 250 $Cd/cm^2$ Brightness of white image: 125 $Cd/cm^2$→Brightness of lighting 50: about 125 $Cd/cm^2$ In the case of the relation between G of the white member 10 and that of the white image represented by expression (5), if the brightness of the lighting 50 is the following value and if the value of G of the white image is the same as that of the white member 10, the brightness of the white image is about the same as that of the lighting 50.

Brightness of lighting 50: 250 $Cd/cm^2$→Brightness of white image: about 250 $Cd/cm^2$ Brightness of lighting 50: 125 $Cd/cm^2$→Brightness of white image: about 125 $Cd/cm^2$ In the case of the relation between G of the white member 10 and that of the white image represented by expression (6), if the brightness of the white image is the following value and if the value of G of the white member 10 is half of that of the white image, the brightness of the lighting 50 is about half of that of the white image.

Brightness of white image: 250 $Cd/cm^2$→Brightness of lighting 50: about 125 $Cd/cm^2$ Brightness of white image: 125 $Cd/cm^2$→Brightness of lighting 50: about 62.5 $Cd/cm^2$ In the case of the relation between G of the white member 10 and that of the white image represented by expression (6), if the brightness of the lighting 50 is the following value and if the value of G of the white image is twice as high as that of the white member 10, the brightness of the white image is about twice as high as that of the lighting 50.

Figure 5:
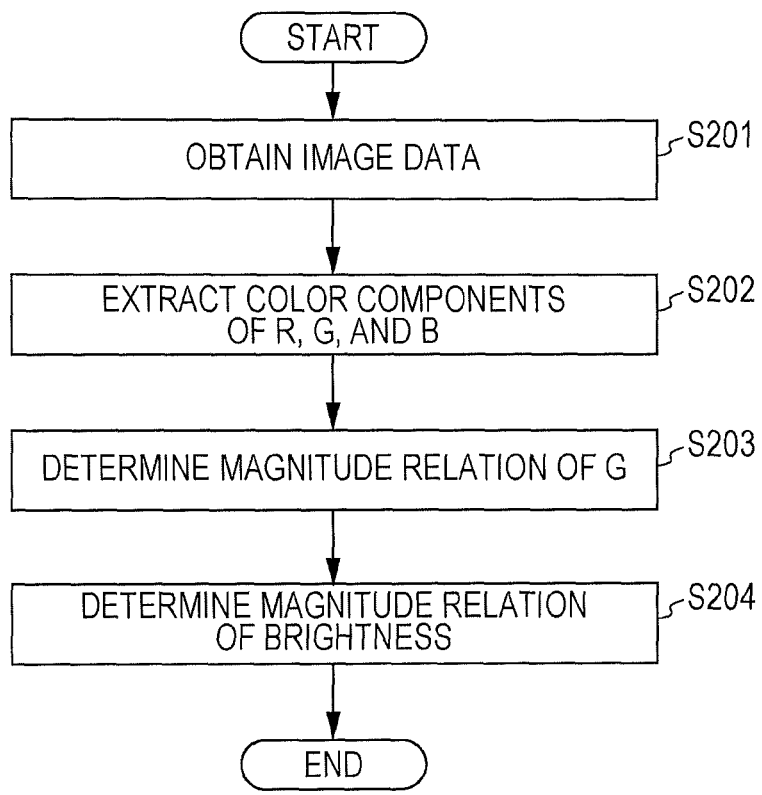
FIG. 5 is a flowchart illustrating an operation performed by a color processing device of a second exemplary embodiment.

Brightness of lighting 50: 250 $Cd/cm^2$→Brightness of white image: about 500 $Cd/cm^2$ Brightness of lighting 50: 125 Cd/cm$^2$→Brightness of white image: about 250 Cd/cm$^2$ FIG. 5 is a flowchart illustrating an operation performed by the color processing device 40 according to the second exemplary embodiment.

Operations of steps S201 and S202 are respectively similar to steps S101 and S102 of FIG. 4, and thus, an explanation thereof will be omitted.

After step S202, in step S203, the relation determining unit 44 determines the magnitude relation between G of the white member 10 and that of the white image.

Then, in step S204, the relation determining unit 44 determines the magnitude relation between the brightness of the lighting 50 and that of the white image. In this manner, on the basis of the brightness of one of the lighting 50 and the white image, the brightness of the other one of the lighting 50 and the white image is estimated. Alternatively, the absolute value of the brightness of the other one of the lighting 50 and the white image may be estimated.

In the above-described color processing device 40, it is possible to determine the color temperature or the brightness of the lighting 50 and that of a white image displayed on the display device 20 by using a simple method.

In the first and second exemplary embodiments, the use of an expensive measuring device is not necessary. The color temperature or the brightness may be determined substantially without being influenced by the imaging conditions of the imaging device 30. The imaging device 30 may perform an imaging operation in an auto mode by automatically setting the imaging conditions. Additionally, it is not necessary to prepare many items of information prior to an imaging operation, and thus, it is not likely that the imaging operation will become complicated.

In the above-described first and second exemplary embodiments, the color information storage unit 43 stores therein the color temperature or the brightness of one of the lighting 50 and a white image. Instead, the color information storage unit 43 may store parameters, such as a model type of lighting 50, a symbol representing the color temperature (for example, daylight (D) color, neutral (N) color, and light (L) color), a symbol representing the illuminance, the distance of the white member 10 and the display device 20 to a light-emitting source used for the lighting 50, the number of items of lighting 50, and the size and the illuminance of the lighting 50. The color information storage unit 43 may store the relationships of these parameters to the color temperature or the brightness and may replace one of the parameters specified by a user by the color temperature or the brightness.

In the above-described first and second exemplary embodiments, the imaging conditions of the imaging device 30 are automatically set in an auto mode. Alternatively, a user may change the settings of the white balance as the imaging conditions, and the lighting 50 and a white image displayed on the display device 20 may be imaged by using the imaging conditions set by the user. As the imaging conditions, the settings of the exposure may be changed. In this manner, by performing an imaging operation under plural imaging conditions, the precision in estimating the color temperature or the brightness is enhanced.

(Program)

Processing performed by the color processing device 40 in the above-described first and second exemplary embodiments is prepared as a program, such as application software, as discussed above.

Accordingly, processing performed by the color processing device 40 may be realized as a program causing a computer to implement: an image data obtaining function of obtaining image data indicating an image of the white member 10 illuminated by the lighting 50 and an image of the display device 20 on which a white image is displayed; a color component extracting function of extracting color components of R, G, and B from the image data indicating the image of the white member 10 and the image of the white image, and a relation determining function of determining the relations between the color temperature and/or the brightness of the lighting 50 and that of the white image, on the basis of the magnitude relation of the extracted color components.

The program implementing the exemplary embodiments may be provided by using a communication medium, or may be stored in a recording medium, such as a compact disc-read only memory (CD-ROM), and be provided.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A color processing device comprising:
   an image data obtaining unit that obtains image data which is obtained by imaging a white member illuminated by a light source and a display device on which a white image is displayed;
   a color component extracting unit that extracts color components of red, green, and blue from image data concerning the white member and image data concerning the white image; and
   a relation determining unit that determines a relation between a color temperature and/or a brightness level of the light source and a color temperature and/or a brightness level of the white image, on the basis of a magnitude relation of the extracted color components.

2. The color processing device according to claim 1, wherein the relation determining unit determines a magnitude relation between the color temperature of the light source and the color temperature of the white image displayed on the display device, on the basis of a magnitude relation of a ratio between the color components of blue and the color components of red.

3. The color processing device according to claim 2, wherein:
   the color temperature of one of the light source and the white image is changed, and the image data obtaining unit obtains a plurality of items of image data, each of the plurality of items of image data being obtained by imaging the white member and the display device on which the white image is displayed; and
   the relation determining unit determines an upper limit and a lower limit of the color temperature of the other one of the light source and the white image.

4. The color processing device according to claim 1, wherein the relation determining unit determines a magnitude relation between the brightness level of the light source and the brightness level of the white image displayed on the display device, on the basis of a magnitude relation of the color components of green.

5. The color processing device according to claim 2, wherein the relation determining unit determines a magnitude relation between the brightness level of the light source and the brightness level of the white image displayed on the display device, on the basis of a magnitude relation of the color components of green.

6. The color processing device according to claim 3, wherein the relation determining unit determines a magnitude relation between the brightness level of the light source and the brightness level of the white image displayed on the display device, on the basis of a magnitude relation of the color components of green.

7. A color processing system comprising:
a white member;
a display device that displays an image;
an imaging device that images the white member illuminated by a light source and the display device on which a white image is displayed; and
a color processing device that determines a relation between a color temperature and/or a brightness level of the light source and a color temperature and/or a brightness level of the white image, on the basis of image data obtained by imaging the white member and the display device by using the imaging device,
the color processing device including
an image data obtaining unit that obtains the image data,
a color component extracting unit that extracts color components of red, green, and blue from image data concerning the white member and image data concerning the white image, and
a relation determining unit that determines a relation between the color temperature and/or the brightness level of the light source and the color temperature and/or the brightness level of the white image, on the basis of a magnitude relation of the extracted color components.

8. The color processing system according to claim 7, wherein alignment information for placing the display device on the white member and focusing information for focusing the white member by using the imaging device are indicated on the white member.

9. A non-transitory computer readable medium storing a program causing a computer to execute a process, the process comprising:
obtaining image data which is obtained by imaging a white member illuminated by a light source and a display device on which a white image is displayed;
extracting color components of red, green, and blue from image data concerning the white member and image data concerning the white image; and
determining a relation between a color temperature and/or a brightness level of the light source and a color temperature and/or a brightness level of the white image, on the basis of a magnitude relation of the extracted color components.

* * * * *